UNITED STATES PATENT OFFICE.

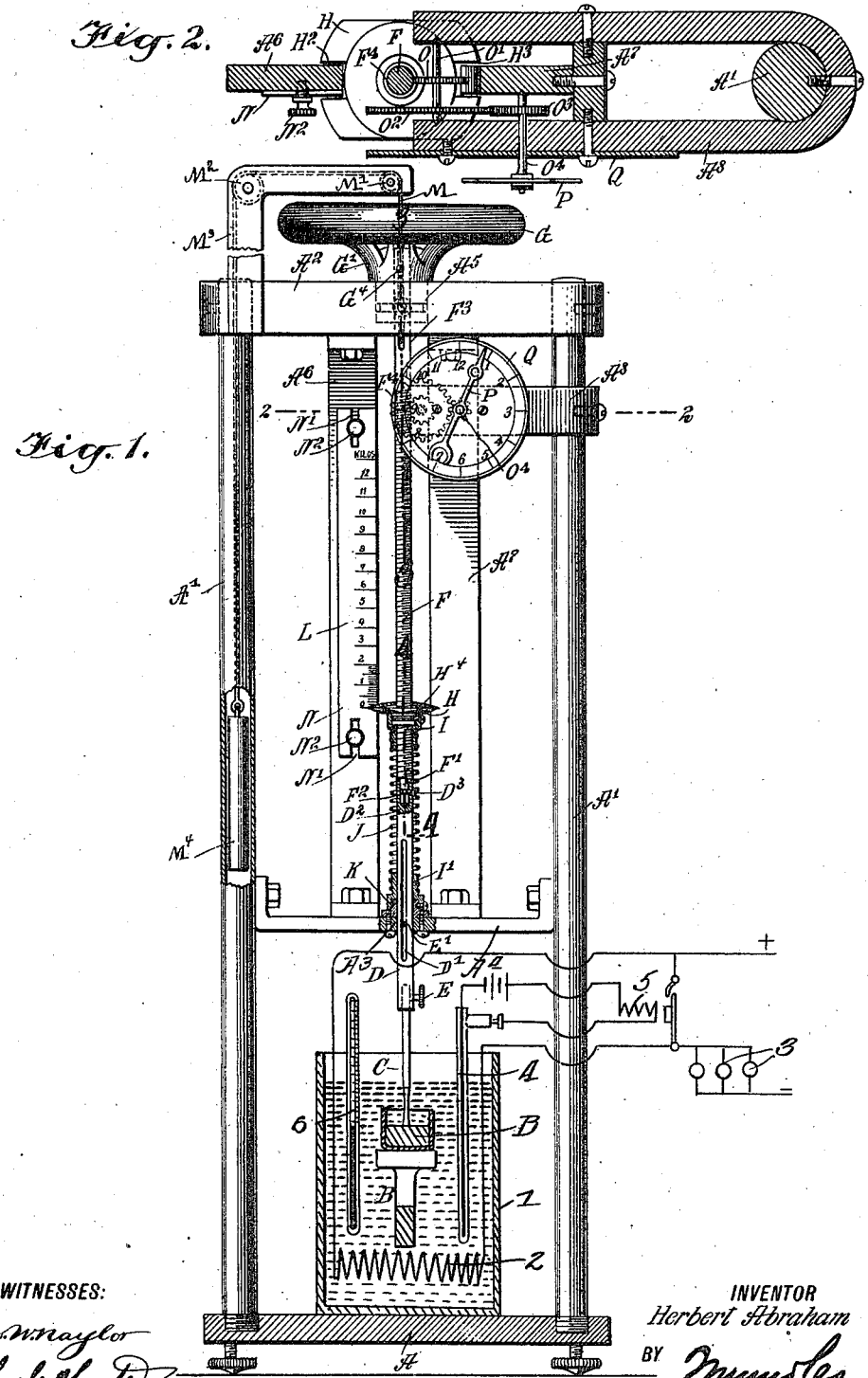

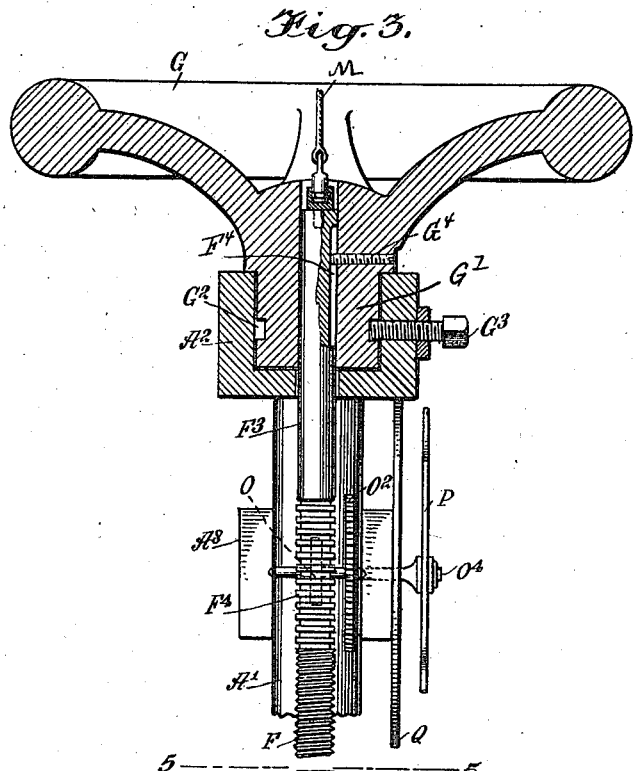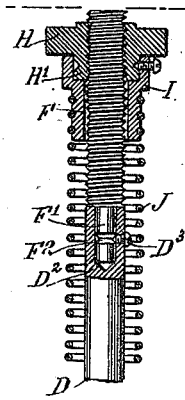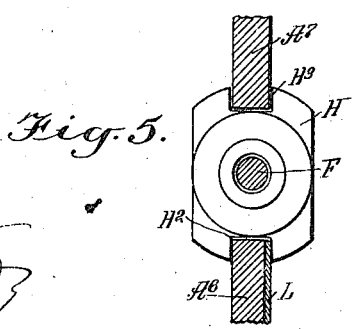

HERBERT ABRAHAM, OF BOUNDBROOK, NEW JERSEY.

TESTING-MACHINE FOR PLASTIC SUBSTANCES.

989,471.　　　　　Specification of Letters Patent.　　Patented Apr. 11, 1911.

Application filed February 4, 1910. Serial No. 542,039.

*To all whom it may concern:*

Be it known that I, HERBERT ABRAHAM, a citizen of the United States, and a resident of Boundbrook, in the county of Somerset and State of New Jersey, have invented a new and Improved Testing-Machine for Plastic Substances, of which the following is a full, clear, and exact description.

The object of the invention is to provide a new and improved testing machine, more especially designed for testing plastic materials, and arranged to give an accurate indication of the hardness of the material tested, and to provide a practically unlimited range of action of the machine. For the purpose mentioned, use is made of a manually-controlled penetrating means for penetrating the material a predetermined distance in a predetermined time, and a variable pressure device indicating the resistance encountered by the said penetrating means.

A practical embodiment of the invention is represented in the accompanying drawings forming a part of this specification, in which similar characters of reference indicate corresponding parts in all the views.

Figure 1 is a front elevation of the testing machine, parts being in section; Fig. 2 is an enlarged sectional plan view of the same on the line 2—2 of Fig. 1; Fig. 3 is an enlarged cross sectional view of the connection between the hand wheel and the screw rod, the section being on the line 3—3 of Fig. 1; Fig. 4 is an enlarged cross sectional view of the screw rod, spring and nut moving on the screw rod and indicating on the scale, the section being on the line 4—4, of Fig. 1; and Fig. 5 is a sectional plan view of the same on the line 5—5 of Fig. 4.

In testing machines for testing bituminous materials or plastic substances, and as heretofore constructed, use is made of a weighted needle, which is allowed to act on the material for a definite period of time at a prescribed temperature, and the depth to which the needle penetrates is recorded by means of a suitable measuring device, so that four constant factors and one variable factor are involved, the four constant factors being the size and shape of the needle, the weight applied, the temperature and the interval of time, while the variable factor is the variable distance which the needle penetrates into the material, and which distance is recorded as an indication of the consistency of hardness of the tested material. The total work performed in effecting a penetration is equal to that expended in displacing the plastic solid, plus that used in overcoming the frictional adhesion of the substance in contact with the surface of the needle. When a pointed needle is used both the volume displaced and the frictional adhesion are increased proportionally much more rapidly than the corresponding depth of penetration. In successive time intervals the increments do not follow any definite law, and the depth of penetration of a pointed needle is therefore not a true measure of the hardness of the tested material. Needles of the same numbers vary in cross sectional area, and the range of a No. 2 sewing needle, for instance, acting under a fixed weight, is found in practice to be limited. If the weight actuating the needle is very great its sensitiveness for soft materials becomes sacrificed, and if the weight is relatively small the needle fails to penetrate hard materials. In any event, if different weights are employed the various sets of readings cannot be compared.

The above mentioned defects are overcome by the use of the testing machine presently to be described in detail, and in which a special form of needle or penetrating tool and a variable pressure device are employed, the penetrating tool being manually controlled to penetrate the material at a certain definite, uniform rate, that is, the rate of penetration is maintained constant while the pressure device applied is made the variable factor.

The testing machine is mounted on a suitable frame having a base A, standards A' and a top cross bar A², and on the said base A is placed the material B, to be tested as to its degree of hardness, by the use of a needle C, removably secured to the lower end of a needle holder D, by a set screw E. The needle holder D is mounted to slide up and down in a bearing A³, formed in the cross bar A⁴, attached to the standards A' of the frame A, and suitable means are employed, such as a pin E', held in the bearing A³, and engaging a slot D' in the needle holder D, to prevent the latter from turning. The upper end of the needle holder D is coupled to the lower end of a screw rod F, by providing the needle holder with a socket D², into which extends the reduced end F' of the screw rod F, the said reduced end F' having an annular groove $F^2$, into which projects a pin or screw $D^3$ held on the upper end of the holder D. Thus the needle holder is coupled to the screw rod in such a manner that the needle holder moves up and down with the screw rod, and the latter can turn without turning the needle holder, which is held against rotation by the pin $E'$ engaging the slot $D^2$. The upper end $F^3$ of the screw rod F is non-threaded and slidingly engages a bore in a hand wheel G, having its hub $G'$ mounted to turn in a suitable bearing $A^5$, formed in the cross bar $A^2$ of the frame of the machine. The hub $G'$ is provided with an annular groove $G^2$ into which projects a screw or pin $G^3$, held on the cross bar $A^2$, to allow the hand wheel G to turn and to hold it against axial movement. The hand wheel G is provided with a pin $G^4$ extending into a groove $F^4$, formed lengthwise on the screw rod F, so that the latter is turned on turning the hand wheel G, at the same time the screw rod F is free to slide up or down.

On the screw rod F screws a nut H, provided on its hub $H'$ with a collar I, to which is secured the upper end of a spring J, secured at its lower end to a collar $I'$ fastened to a flange K, secured to the cross bar $A^4$, as plainly indicated in Fig. 1. The spring J exerts a downward pressure on the nut H and consequently on the screw rod F. The nut H is held against turning, and for this purpose is provided on opposite sides with slots $H^2$, $H^3$, engaging vertical guideways $A^6$, $A^7$ attached to the cross bars $A^4$ and $A^2$. The nut H indicates on a scale L, representing kilos and sub-divisions, or other weight measure, the scale L being arranged on a plate N having slots $N'$ at its ends for engagement by screws $N^2$ screwing in the guideway $A^6$ to secure the plate N in position and to allow adjustment thereof, so as to bring the scale L in proper relation to the nut H, that is, to bring the zero point of the scale in register with the nut H at the time the latter is in its lowermost position, and the lower end of the needle C rests on top of the material B to be tested. On top of the nut H rests a spring plate $H^4$, having slots engaging the guideways $A^6$, $A^7$, so that when the nut H rises, it carries the plate $H^4$ along to its maximum position, and when the nut H descends, the plate $H^4$ remains in this position and hence indicates the maximum reading on the scale L. It is understood that the plate $H^4$, owing to its resiliency, readily clamps itself in position on the guideways $A^6$, $A^7$ as soon as the nut H descends.

The screw rod F, the needle holder D and the needle C are counterbalanced, to render the machine very sensitive, and for this purpose the upper end of the screw rod F is connected with a cord M, extending over guide pulleys $M'$, $M^2$, journaled in a bracket $M^3$ attached to the top cross bar $A^2$. The end of the cord M extends downward into one of the hollow standards $A'$, and supports a counterbalancing weight $M^4$.

On the screw rod F between the upper end $F^3$ and the upper threads of the screw rod F is arranged a worm $F^4$, in mesh with a worm wheel O, secured on a shaft $O'$, journaled in suitable bearings arranged in a bracket $A^8$, secured to one of the standards $A'$. On the shaft $O'$ is fastened a gear wheel $O^2$, in mesh with a pinion $O^3$, secured on a shaft $O^4$, journaled in the bracket $A^8$ and carrying at its forward end a pointer P, indicating on a dial Q, attached to the bracket $A^8$.

The operation is as follows: When testing the material B, the needle C is lowered to rest on the top of the material, the nut H then being opposite the zero mark of the scale L and the spring J being without compression. The operator now turns the hand wheel G, so that the screw rod F is rotated and moves downward, and with it the holder D and the needle C, for the latter to penetrate into the material B, the rotation of the screw rod F causing a turning of the pointer P by the action of the train of gear wheels connecting the pointer P with the worm $F^4$ on the screw rod F, as previously explained. Now the resistance offered by the material B to the penetration of the needle C allows the nut H to move upward on the turning of the screw rod F, whereby the spring J is placed under tension, the amount of tension being indicated by the screw nut H on the corresponding mark of the scale L. The hand wheel G is turned until the needle C has advanced into the material B a distance of one centimeter per minute, the time being controlled by a watch or a metronome. In order to enable the operator to turn the hand wheel G with the desired regularity, the gearing connecting the screw rod F with the pointer P, is so arranged that the operator can readily control the speed with which the hand wheel G is turned, by following the pointer around the dial Q; in other words, the pointer P serves as a guide to the operator, to enable the latter to turn the hand wheel G at the proper speed to advance the needle C one centimeter per minute. In practice, the material B to be tested is preferably supported in a small reservoir 1 filled with water and maintained at a constant temperature of 77° F. by means of a heating coil 2 connected with incandescent lamps 3 in series, which in turn are controlled by a mercury thermostat 4 working in conjunction with a relay 5. The temperature of the water is indicated by a thermometer 6. This contrivance in practice actually prevents the temperature fluctuating more than about half a degree F. The heating coil may be used to maintain the temperature of the water at either 77° F. or 100° F., as desired. For testing the material B at 32° F. finely chopped ice or snow may be recommended.

When the needle C, having a head say of 0.01 sq. cm., commences to penetrate the material B at a specified speed of one centimeter per minute, a maximum reading is obtained on the scale L, which remains fairly constant throughout the penetration. By practical tests I have found that the degree of hardness as it appears to the senses corresponds to the square root of the number of grams indicated on the scale L, and consequently readings are expressed as the square root of the number of grams which must be applied to a round or flat surface of 0.01 sq. cm. in area, to cause the needle to penetrate it a distance of one centimeter in exactly one minute. The amount thus obtained is termed the hardness of the material, and the readings conveniently form a scale of hardness expressed in degrees ranging from 0 to 100. The following figures will convey some idea as to the range of this scale:

Vaseline _____ 0.3° hardness at 77° F.
Commercial D
  grade asphaltum_ 16.0°   "   "   "   "
Paraffin wax_____ 23.7°   "   "   "   "
Ozocerite _____ 43.6°   "   "   "   "
Gilsonite No. 1____ 94.3°  "   "   "   "

The needle C used is preferably formed with a round, flat head on a reduced shank, as plainly indicated in Fig. 1. This form of needle is capable of being duplicated at any time without difficulty. On account of the reduced shank the frictional adhesion of the material is localized to the flat head and remains uniform throughout the entire operation. It will also be noticed that the flat head may be readily brought in contact with the surface of the material B, without requiring any particular skill on the part of the operator or incurring danger of introducing an error through faulty adjustment. The greatest advantage of this procedure however, is due to the fact that inasmuch as identical volumes of material are displaced in every determination, the weight applied forms a true measure of the hardness of the material.

For testing very soft substances, the scale L is changed to read to grams instead of tenths of a kilogram, as shown in Fig. 1 and described above.

It is understood that the only particular skill required for successfully using the machine, is in properly turning the hand wheel for maintaining a uniform rate of penetration; but by causing the pointer P to travel in unison with the seconds hand of a watch or the seconds beats of a metronome, the desired result is easily and accurately obtained.

Having thus described my invention, I claim as new and desire to secure by Letters Patent:

1. A testing machine for testing plastic materials, comprising a needle for penetrating the material to be tested, a screw rod carrying the said needle, a device mounted to turn and engaging the said screw rod to turn the latter, the said screw rod being mounted to slide in the direction of its length, relative to said device, a nut screwing on the said screw rod and mounted to move in the direction of the length of the screw rod and a spring pressing the said nut.

2. A testing machine for testing plastic materials, comprising a needle for penetrating the material to be tested, a manually controlled device mounted to turn, a screw rod carrying the said needle and mounted to turn with said device and to slide in the direction of its length relative to said device, a nut screwing on the said screw rod and mounted to move in the direction of the length of the screw rod, a scale on which indicates the said nut, and a spring connected at one end to a fixed support and connected at its other end with the said nut.

3. A testing machine for testing plastic materials, comprising a needle for penetrating the material, a needle holder engaging the said needle, a screw rod coupled to the said needle holder, a hand wheel mounted to turn and engaging the said screw rod, the said screw-rod being mounted to turn with the said hand wheel and to slide in the direction of its length relative to said hand wheel, a nut screwing on the said screw rod, a fixed scale on which indicates the said nut, a spring connected at one end to a fixed support and connected at its other end to the said nut, and a counterbalancing device for the said screw rod, needle holder and needle.

4. A testing machine for testing plastic materials, comprising a needle for penetrating the material, a needle holder engaging the said needle, a screw rod coupled to the said needle holder, a nut screwing on the said screw rod, a fixed scale on which indicates the said nut, a spring connected at one end to a fixed support and connected at its other end to the said nut, a hand wheel mounted to turn and engaging the said screw rod, the said screw rod being mounted to turn with the hand wheel and to slide in the direction of its length, relative to said hand wheel, and means for holding the said needle holder against turning.

5. A testing machine for testing plastic materials, comprising a needle for penetrating the material to be tested, a screw rod carrying the said needle, a hand operated device mounted to turn, the said screw rod being mounted to turn with said device and to slide in the direction of its length relative to said device, a nut screwing on the said screw rod and mounted to move in the direction of the length of the screw rod, a spring pressing the said nut, and an indicator for indicating the movement of the said needle.

6. A testing machine for testing plastic materials, comprising a needle for penetrating the material to be tested, a hand wheel mounted to turn, a screw rod carrying the said needle and mounted to turn with the said hand wheel, and to slide in the direction of its length relative to said hand wheel, a nut screwing on the said screw rod and mounted to move in the direction of the length of the screw rod, a spring pressing the said nut, a train of gear wheels connected with and driven by the said screw rod, a dial, and a pointer indicating on the said dial and actuated by the said train of gear wheels.

7. A testing machine for testing plastic materials, comprising a tool for penetrating the material to be tested, manually controlled means for moving said tool, means for indicating the movement of the penetrating tool, means for indicating the resistance encountered by the penetrating tool, and means for counterbalancing the said tool.

8. A testing machine for testing plastic materials comprising a manually controlled screw rod, a penetrating tool carried by the screw rod for penetrating the material, a nut on the said screw rod and mounted to move in the direction of the length of the screw rod, means for holding the nut against turning when the screw rod is turned, a spring adapted to exert tension on the nut, a scale on which the nut indicates, and an indicator driven by the screw rod.

9. A testing machine for testing plastic materials, comprising a frame a penetrating tool for penetrating the material to be tested, a hand wheel having a hub, a bearing on the frame of the machine in which the hub is mounted to turn, a screw rod carrying the said penetrating tool, the upper end of said rod slidably engaging a bore in the hand wheel, the said hand wheel having means for engaging the screw rod to turn the latter, a nut on the said screw rod and movable in direction of the length of the screw rod, the said nut being provided on opposite sides with slots, vertical guide-ways on the frame of the machine and engaged by said slots, a scale carried by one of said guideways on which indicates the said nut, a spring plate for indicating on the said scale, the plate being adapted to rest on the said nut and having slots engaging the said guideways, the said spring plate being carried upward by the said nut and having clamping engagement with the said guideways, whereby it remains in the elevated position when the nut descends, and a spring exerting downward tension on the said nut.

10. A testing machine for testing plastic materials, comprising a tool for penetrating the material to be tested, manually controlled means for moving said tool, a spring placed under tension by the resistance of the material, a scale, means for indicating on said scale the degree of tension imparted to the spring, a dial, and a pointer indicating on said dial, the movement of the pointer being controlled from the said manually controlled means.

11. A testing machine for testing plastic materials, comprising a tool for penetrating the material to be tested, manually controlled means connected with the tool for moving the same, a variable pressure device for indicating the resistance encountered by the said tool, and a counterbalancing device for the said tool.

In testimony whereof I have signed my name to this specification in the presence of two subscribing witnesses.

HERBERT ABRAHAM.

Witnesses:
STANLEY BRAMPTON,
JONATHAN B. PARDOE.